(12) United States Patent
Merrill (10) Patent No.: US 10,576,782 B2
(45) Date of Patent: Mar. 3, 2020

(54) HUB LUBRICANT CONTAINMENT SEAL SYSTEM

(71) Applicant: Compagnie Generale des Etablissements Michelin, Clermont-Ferrand (FR)

(72) Inventor: Zachary Alexander Merrill, Greenville, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 16/307,178

(22) PCT Filed: Jun. 9, 2017

(86) PCT No.: PCT/US2017/036828
§ 371 (c)(1),
(2) Date: Dec. 5, 2018

(87) PCT Pub. No.: WO2017/218348
PCT Pub. Date: Dec. 21, 2017

(65) Prior Publication Data
US 2019/0135034 A1    May 9, 2019

Related U.S. Application Data

(63) Continuation of application No. PCT/US2016/037998, filed on Jun. 17, 2016.

(51) Int. Cl.
*B60B 27/00* (2006.01)
*F16C 19/26* (2006.01)
*F16C 33/78* (2006.01)

(52) U.S. Cl.
CPC .......... *B60B 27/0073* (2013.01); *F16C 19/26* (2013.01); *F16C 33/783* (2013.01);
(Continued)

(58) Field of Classification Search
CPC .. F16C 19/26; F16C 33/7816; F16C 33/7826; F16C 33/7846; F16C 2326/02; F16C 2326/05; B60B 27/0073
(Continued)

(56) References Cited

U.S. PATENT DOCUMENTS 3,264,044 A  *  8/1966  Davenport ............... F16C 23/06
                                                    384/619
4,811,992 A  *  3/1989  Steiner .................... B60B 37/10
                                                    301/1
(Continued)

FOREIGN PATENT DOCUMENTS

DE         2533618 A1    1/1977

OTHER PUBLICATIONS

European Patent Office; International Search Report and Written Opinion for patent application PCT/US2016/037998; dated Mar. 17, 2017; Publisher: European Patent Office, Rijswijk, Netherlands, pp. 1-10, enclosed.
(Continued)

*Primary Examiner* — Marcus Charles
(74) *Attorney, Agent, or Firm* — Neal P. Pierotti (57) ABSTRACT

An apparatus for a vehicle is provided that includes a spindle sleeve with a spindle sleeve inner surface axis. The spindle sleeve has a spindle sleeve outer surface axis that is not coaxial with the spindle sleeve inner surface axis. A hub with a hub axis coaxial with the spindle sleeve outer surface axis is also present. Also included are first and second bearings within the hub, and a containment seal that engages the hub and the spindle sleeve. A sleeve washer is included, and the containment seal is located between the first bearing and the sleeve washer in an axial direction of the hub.

15 Claims, 6 Drawing Sheets

(52) U.S. Cl.
CPC ...... *F16C 33/7816* (2013.01); *F16C 33/7826* (2013.01); *F16C 2326/02* (2013.01); *F16C 2326/05* (2013.01)

(58) Field of Classification Search
USPC ....... 384/472, 477, 488, 504, 544, 562, 563, 384/583, 589, 517, 520, 554; 301/108.1, 301/108.4, 131
See application file for complete search history.

(56) References Cited

U.S. PATENT DOCUMENTS

| | | | | |
|---|---|---|---|---|
| 5,046,870 A | * | 9/1991 | Ordo | F16C 25/06 384/563 |
| 5,117,617 A | * | 6/1992 | Scag | A01D 34/6806 384/128 |
| 5,190,355 A | * | 3/1993 | Hobbie | B60B 27/001 301/105.1 |
| 5,560,687 A | * | 10/1996 | Hagelthorn | B60B 27/001 301/105.1 |
| 5,893,202 A | | 4/1999 | Graham | |
| 5,904,427 A | * | 5/1999 | Braun | B60B 27/0005 384/472 |
| 6,776,261 B2 | * | 8/2004 | Eriksen | F16C 19/52 184/6.4 |
| 6,786,645 B2 | * | 9/2004 | Joki | B60B 27/001 384/488 |
| 7,547,077 B2 | * | 6/2009 | Melberg | G01K 5/62 116/216 |
| 8,689,445 B2 | * | 4/2014 | White | B60B 27/02 29/724 |
| 8,745,875 B1 | * | 6/2014 | Hagelthorn | F16C 41/008 29/724 |
| 2017/0247055 A1 | | 8/2017 | Merrill | |
| 2018/0009479 A1 | | 1/2018 | Merrill | |

OTHER PUBLICATIONS

European Patent Office; International Search Report and Written Opinion for patent application PCT/US2017/036828; dated Aug. 28, 2017; Publisher: European Patent Office, Rijswijk, Netherlands, pp. 1-9, enclosed.

* cited by examiner

HUB LUBRICANT CONTAINMENT SEAL SYSTEM

CROSS-REFERENCE TO RELATED APPLICATIONS

The present application is a 35 U.S.C. § 371 application of PCT/US17/36828 filed on Jun. 9, 2017 and entitled "Hub Lubricant Containment Seal System." PCT/US17/36828 claims the benefit of PCT/US16/37998 filed on Jun. 17, 2016 and entitled "Hub Lubricant Containment Seal System." PCT/US17/36828 and PCT/US16/37998 are both incorporated by reference herein in their entireties for all purposes.

FIELD OF THE INVENTION

The subject matter of the present invention relates to wheels that include a spindle sleeve device such as may be used for imparting camber and/or toe to the wheel hub of the vehicle. More particularly, the present application involves a hub lubricant containment seal system for a prepackaged hub assembly that includes a spindle sleeve device.

BACKGROUND OF THE INVENTION

The alignment of a vehicle's wheel plane relative to the path traveled by the vehicle affects not only the handling of the vehicle but also affects the wear on the tires. As used herein, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Generally speaking, toe changes of even one-tenth of a degree can have an impact on tire wear. Thrust is the resulting direction of travel of an axle as opposed to the direction that might be expected from the orientation of the tires on the axle.

When a typical axle is installed under a vehicle (used herein to refer to both motorized vehicles as well as trailers) and placed into normal operation under typical loading conditions, the camber does not remain at zero. The axle under load, although quite rigid, does flex. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces are not flat transversely across the road. When a typical tandem axle vehicle (tractor or trailer) turns while traveling in a forward direction, the dynamics of the vehicle favor lateral grip by the forward axle tires. As a result the pivot point of the vehicle shifts toward the forward axle tires and the rear axle tires will tend to have greater slip laterally as the vehicle negotiates a turn maneuver. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle. So as a consequence, the tire irregular wear issue is usually worst on the inboard surface of the left front tire. Next worst is the left rear tire. The right front tire comes next but is sometimes similar in severity to the left rear. The most even wear usually is found on the rear right tire depending upon the particular application, load, and routes normally traveled. It should be obvious that in countries such as Australia, where drivers drive on the left side of the road instead of the right side, the above would be reversed.

One mechanism of adjusting axial alignment involves a system that includes a spindle sleeve that has an outer surface about a first axis of revolution and an inner surface about a second axis of revolution at an angle to the first axis. The predetermined angle may be in a vertical direction to induce a change in camber, in a horizontal direction to induce a change in toe, or a combination thereof. Assembly of such systems onto an axle of a vehicle requires the installer correctly assemble the device and provide the proper amount and type of lubricant to the inside of the hub that contains the spindle sleeve and bearings. In addition, an installer may inadvertently introduce contamination into the assembly to further frustrate proper lubrication of the bearings and other components. It would be desirable to provide a mechanism of affording lubrication to the spindle sleeve and bearings while at the same time avoiding contamination and the possibility of installer error.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The following terms are defined as follows for this disclosure:

"Axial direction" refers to a direction parallel to the axis of rotation of for example, the hub or the wheel as it travels along a road surface.

"Radial direction" refers to a direction that is orthogonal to the axial direction and extends in the same direction as any radius that extends orthogonally from the axial direction.

"Toe" means the angle of the equatorial plane of the tire with respect to the longitudinal axis of the vehicle.

"Camber" means the angle of the equatorial plane of the tire with respect to the vertical axis of the vehicle.

"Vehicle" includes motorized vehicles and non-motorized vehicles including trailers.

An apparatus 10 is provided that may include a wheel hub 76 that includes lubricant 42 that is contained within a set of bearings 74, 80 with a spindle sleeve 68. A containment seal 14 is included in an apparatus 10 and functions to keep the lubricant 42 within the hub 76 so that the hub 76 could be provided, if desired, as a preassembled unit for subsequent placement onto an axle 12 of a vehicle. The containment seal 14 may allow some gasses to escape therefrom but may function to contain the lubricant 42 which is of a fluid or semi fluid form.

Figure 1:
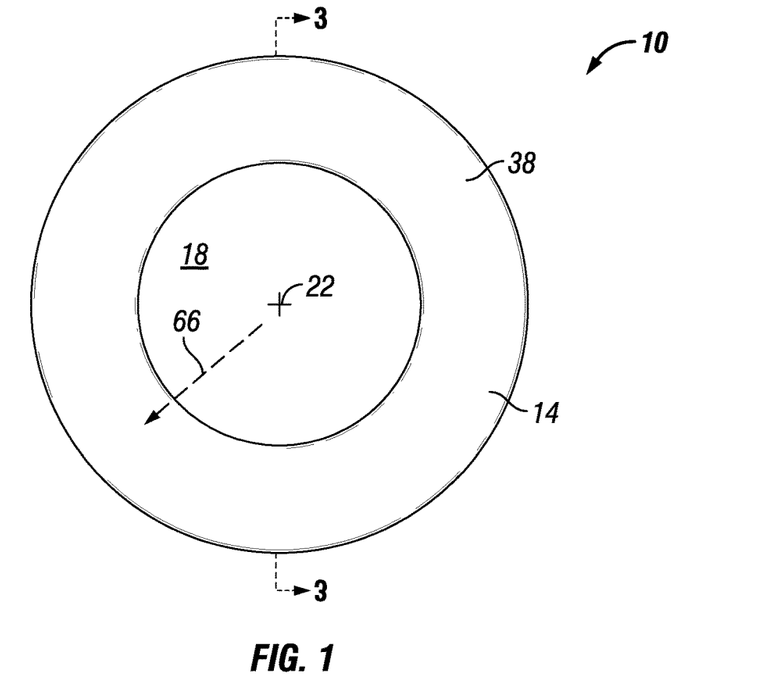
FIG. 1 is a top plan view of a containment seal.
Figure 2:
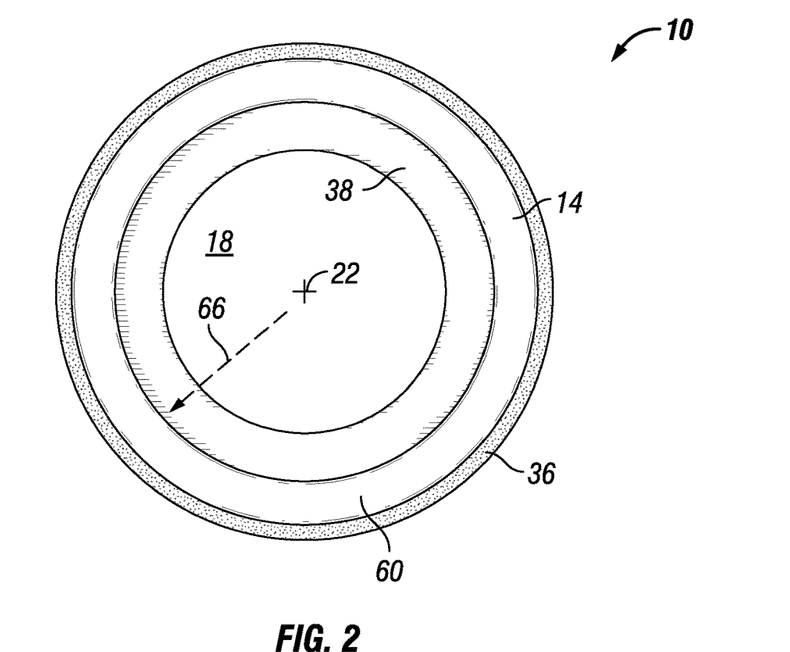
FIG. 2 is a bottom plan view of the containment seal of FIG. 1.
Figure 3:
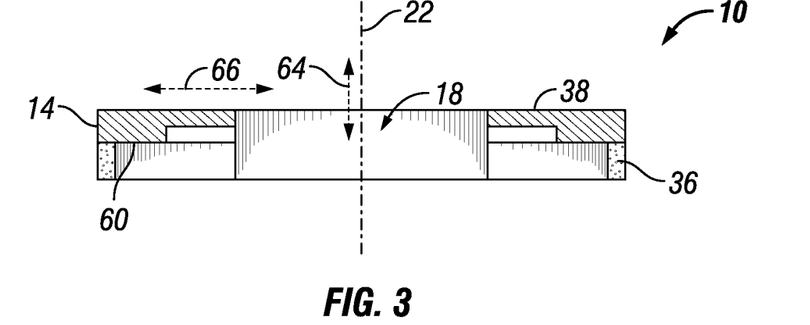
FIG. 3 is a cross-sectional view taken along line 3-3 of FIG. 1.

FIGS. 1-3 disclose a containment seal 14 that may have a body 38 that can be made of metal, such as stainless steel. The body 38 may be disc shaped and can have a containment seal aperture 18 that is a through aperture though the body 38. The body 38 may be a hardened steel washer and can have a thickness of $1/16^{th}$ of an inch thick so that it has a length of $1/16^{th}$ of an inch in the axial direction 16. The containment seal aperture 18 may be of any size and shape and in the embodiment illustrated is circular in shape. The center of the containment seal aperture 18 is located at the containment seal axis 22 that extends through the center of the containment seal 14. A containment seal lip 60 extends from the body 38 in the axial direction 64 of the containment seal 14, and is located at the outer end of the body 38 in the radial direction 66 of the containment seal 14. In some embodiments, the combined axial length of the body 38 and the containment seal lip 60 is $1/16^{th}$ of an inch in the axial direction 16. The containment seal lip 60 may be provided in order to facilitate manufacturing of the containment seal 14 so that the containment seal 14 can be made easier as opposed to the case in which a containment seal lip 60 is not present with the body 38. The containment seal lip 60 has a round shape and can extend 360 degrees about the body 38. A felt ring 36 extends from the containment seal lip 60 also in the axial direction 64 and is likewise located at the outer end of the containment seal 14 in the radial direction 66. The body 38 and the containment seal lip 60 may be made of metal, but the felt ring 36 may be made of a different material such as felt and be more porous and more flexible. The felt ring 36 extends 360 degrees around the containment seal axis 22 and may form the terminal end of the containment seal 14.

Figure 4:
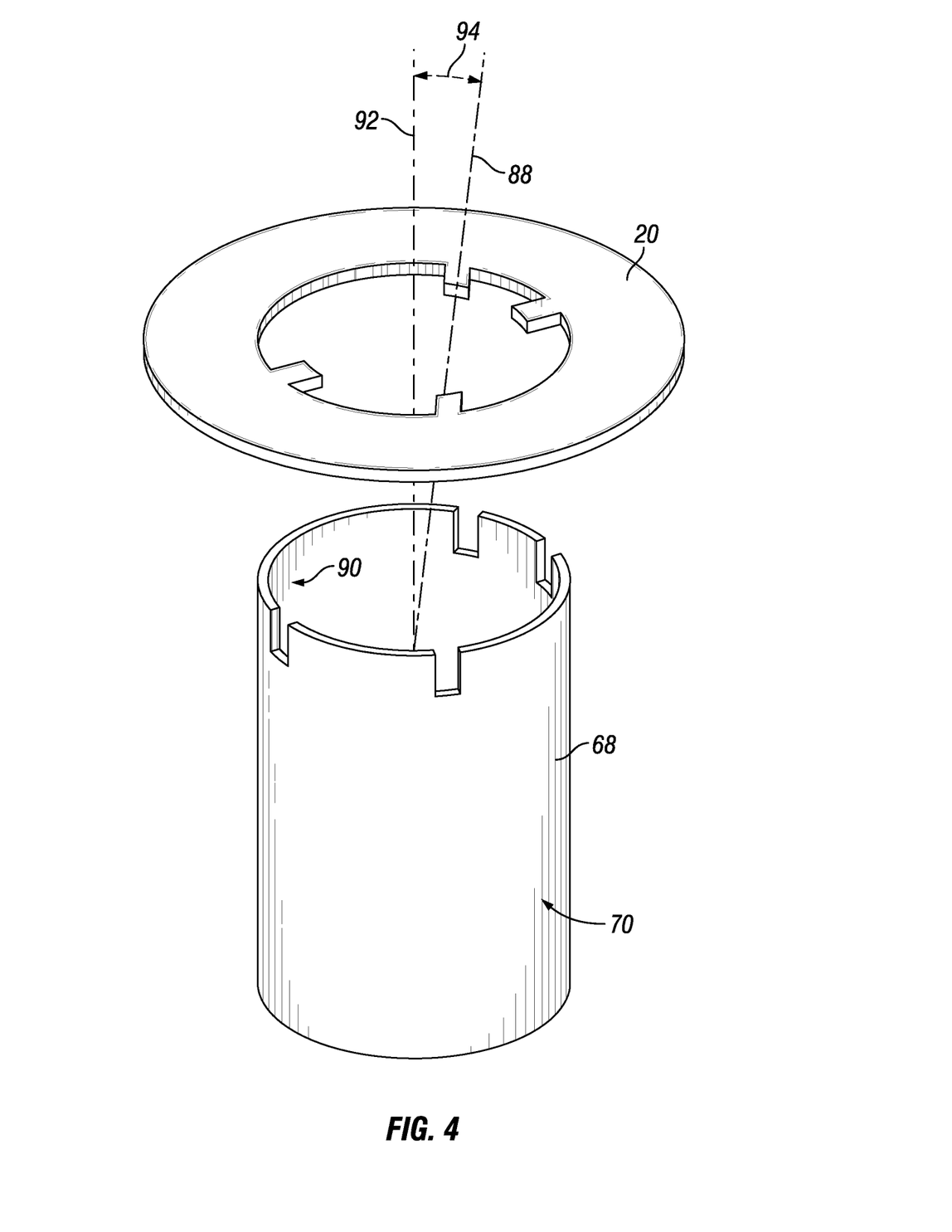
FIG. 4 is a perspective view of a spindle sleeve and a sleeve washer.

The apparatus 10 may include a spindle sleeve 68 as shown in FIG. 4 that may be made of metal such as aluminum or steel. A sleeve washer 20 may be incorporated into the apparatus 10 in certain embodiments and may have a series of tabs about its inner perimeter that can be disposed within complimentary slots at an end of the spindle sleeve 68. The spindle sleeve 68 and the sleeve washer 20 are separate parts, but in certain exemplary embodiments may be integrally or permanently formed with one another. As shown in FIG. 4 with the tab and slot arrangement, a precision fit may be realized in which the tabs of the sleeve washer 20 are pressed into the slots of the spindle sleeve 68 and are retained therein through friction and through the precision fit between these two components.

The spindle sleeve 68 has a spindle sleeve outer surface 70 that has a spindle sleeve outer surface axis 88. A through aperture extends through the spindle sleeve 68, and a spindle sleeve inner surface 90 is formed on the interior of the spindle sleeve 68, and a spindle sleeve inner surface axis 92 extends through the spindle sleeve inner surface 90. The spindle sleeve outer surface axis 88 and the spindle sleeve inner surface axis 92 are oriented at an angle 94 to one another. The axle 12 of the vehicle extends through the spindle sleeve 68 and has an axis 62 that is coaxial with the spindle sleeve inner surface axis 92. The hub 76 is coaxial with the spindle sleeve outer surface axis 88 and rotates about the spindle sleeve outer surface 70. In this regard, camber and/or toe can be introduced into the hub 76 so that the hub 76 is oriented at desired angles to the axle 12 of the vehicle.

Figure 5:
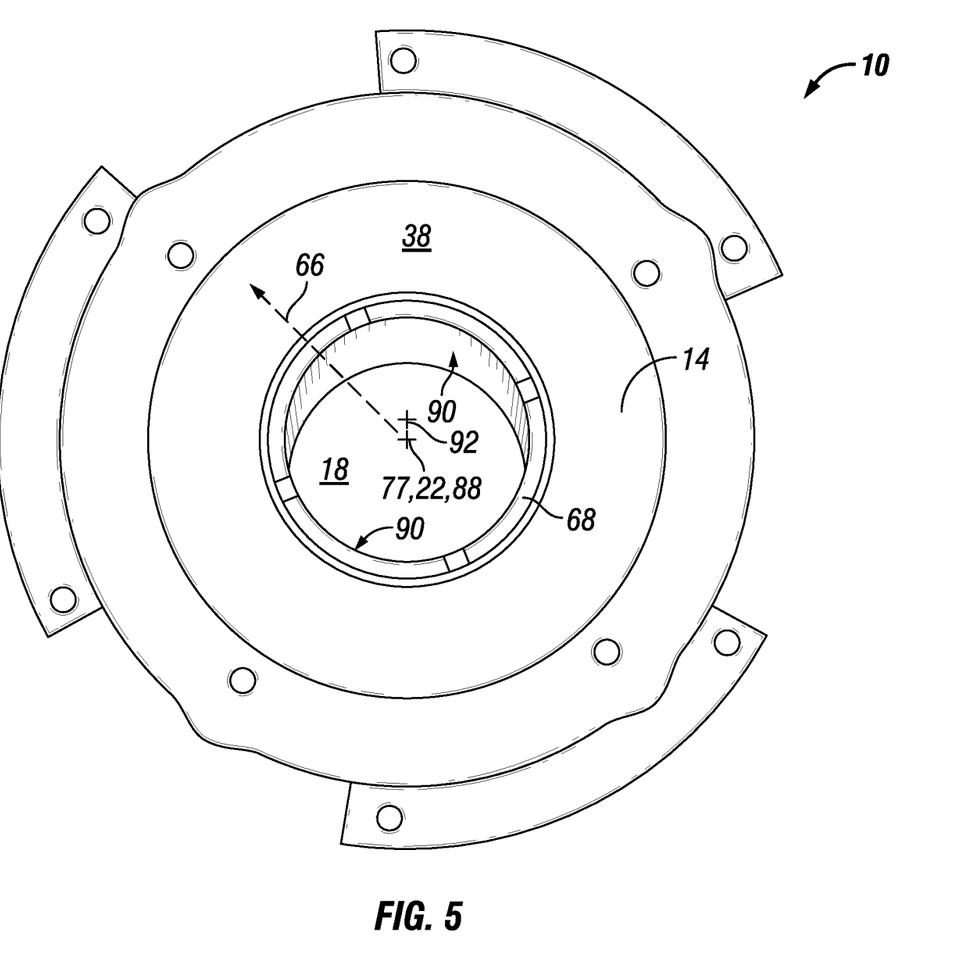
FIG. 5 is a top plan view of an assembled hub, containment seal, and spindle sleeve.

A top view of a portion of the assembly of the apparatus 10 is illustrated in FIG. 5. The hub 76 is shown and has a number of mounting bolts about its perimeter onto which the wheel can be mounted. A series of mounting holes are disposed radially inwards from the mounting bolts and can be used for the mounting of a hubcap 44 thereon. The hub 76 has a hub axis 77 that extends through the center of the hub that likewise includes an aperture. The containment seal 14 is disposed within the hub 76 and the containment seal axis 22 is coaxial with the hub axis 77. The outer radial surface of the containment seal 14 can be precision fit against the inner surface of the hub 76 so that it engages the hub and so that a seal is formed at this location to prevent lubricant 42 from moving between or through the interface between the containment seal 14 and the hub 76. The containment seal aperture 18 is large enough to allow the spindle sleeve 68 to slide through the containment seal aperture 18 and these components may be precision fit to one another, and engage one another, to afford a tight fit between the two. The spindle sleeve inner surface 90 is visible along with the notches at the end of the spindle sleeve 68 in FIG. 5.

Figure 6:
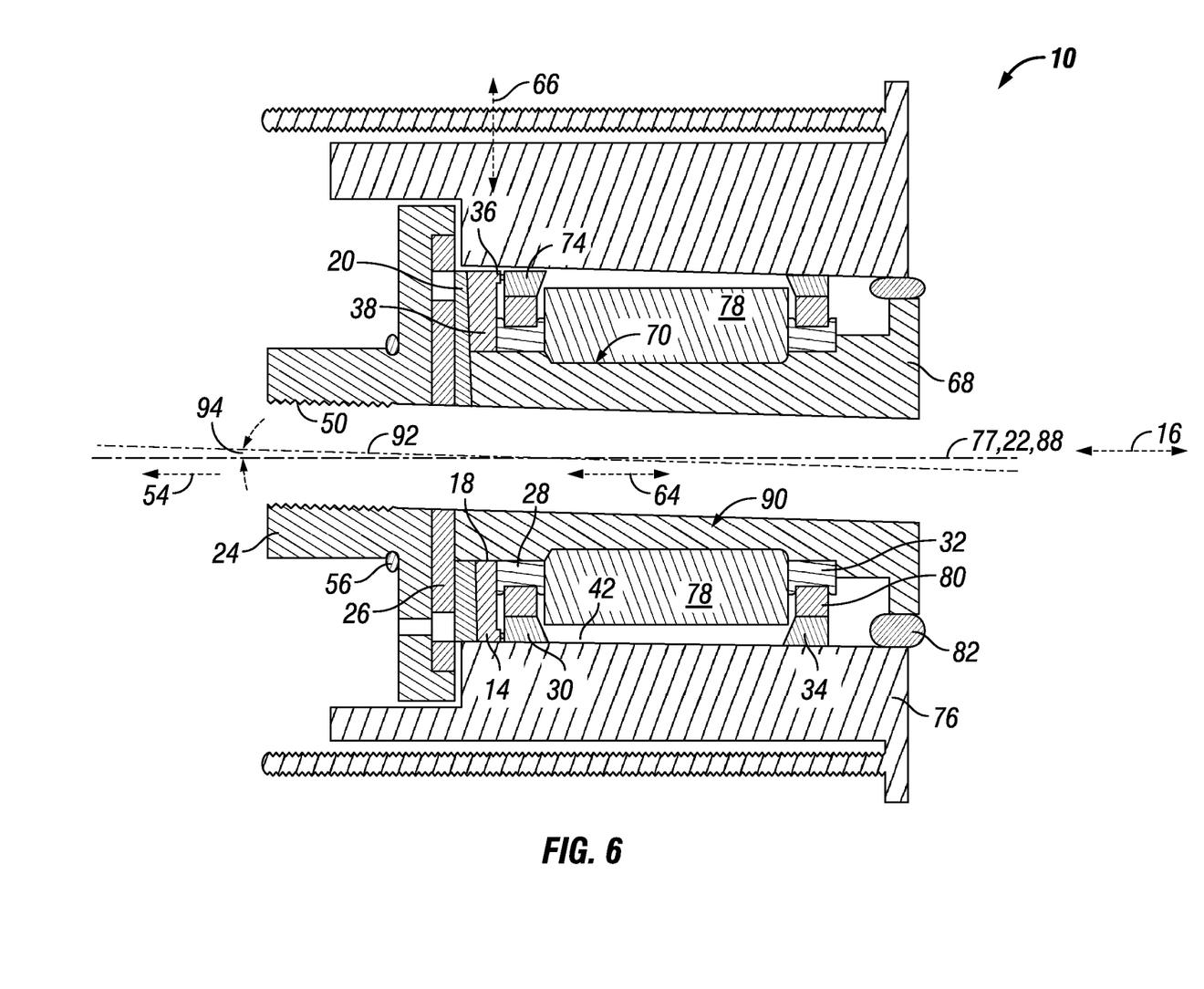
FIG. 6 is a cross-sectional view of the apparatus.

A cross-sectional view of the apparatus 10 is shown in FIG. 6 in which the apparatus 10 can be configured as a self-contained pre-assembled unit that includes the lubricant 42. As the spindle sleeve 68 may be located within the hub 76 and cannot be easily accessed, it may be the case that a mechanism of adjusting the spindle sleeve 68 via rotation of the spindle sleeve 68 is put into place. This may allow for the spindle sleeve 68 to be properly located onto the axle 12 by way of placement of a key of the spindle sleeve 68 into a keyway of the axle 12. The sleeve washer 20 is in rotational communication with the spindle sleeve 68 via the tabs and slots as previously discussed. Rotation of the sleeve washer 20 will cause rotation of the spindle sleeve 68. The sleeve washer 20 may include pins (not shown) that extend into apertures (not shown) of the lock plate 26 so that rotation of the lock plate 26 is likewise translated into the sleeve washer 20 to cause it to rotate. The lock plate 26 includes a series of apertures close to its outer perimeter that align with one or more apertures of a retaining nut 24 that is located adjacent the lock plate 26. A snap ring 56 can be attached to the retaining nut 24, and may include a tab (not shown) that extends through both the aperture of the retaining nut 24 and its aligned aperture of the lock plate 26. Rotation of the retaining nut 24 will cause the lock plate 26 to turn because the tab attached to the retaining nut 24 extends into the aperture of the lock plate 26 to cause rotational motion to be communicated. The retaining nut 24 is on the outside of the apparatus and can be accessed by the installer to allow for its rotation.

The containment seal 14 may or may not rotate with the sleeve washer 20 and spindle sleeve 68 as they rotate. This rotational communication may be due to frictional contact between the terminal end of the body 38 and the sleeve washer 20. However, in some embodiments frictional engagement is not sufficient to allow the containment seal 14 to rotate even though rotational communication is transmitted to the spindle sleeve 68.

The containment seal 14 is located around the spindle sleeve 68 and is located radially outward therefrom. The engagement between the containment seal 14 and the spindle sleeve 68 may be by a precision fit engagement and can be tight enough to prevent lubricant 42 from flowing through the interface engagement between the containment seal 14 and the spindle sleeve 68. The containment seal 14 is located outboard in the outboard direction 54 from the first bearing 74, which is in turn located outboard in the outboard direction 54 from a bearing spacer 78. A second bearing 80 is mounted onto the spindle sleeve 68, and lubricant 42 is located within the space extending from the containment seal 14 to an inboard seal 82 in the axial direction 16. The inboard seal 82 seals an area between the hub 76 and the spindle sleeve 68.

The lubricant 42 may become hot and cause pressure within the sealed space to rise. In order to vent this pressure, the felt ring 36 of the containment seal 14 is present and is porous enough to allow gas to escape but not so porous that solid, semi-solid, or liquid material making up the lubricant 42 can escape. The felt ring 36 may thus allow the sealed space to be vented as necessary.

The first bearing 74 includes an inner race 28 that engages the spindle sleeve 68 and that may engage the face of the body 38 in some instances. An outer race 30 of the first bearing 74 engages the hub 76 and may also be engaged by the felt ring 36. The rollers of the first bearing 74 are contained within the inner race 28 and outer race 30 and may be cylindrical or ball shaped in accordance with various exemplary embodiments. The second bearing 80 is spaced from the first bearing 74 via spacer 78 and does not engage the containment seal 14. The second bearing 80 likewise has an inner race 32 that engages the spindle sleeve outer surface 70, and an outer race 34 that engages the hub 76 with a roller bearing or cylindrical bearing located within the inner race 32 and outer race 34. The second bearing 80 may be made of the same components as the first bearing 74 and may be identical to same in accordance with various exemplary embodiments. The second bearing 80 is free from engagement with the containment seal 14, but may engage the lubricant 42 that fills the space between the containment seal 14 and inboard seal 82 in the axial direction 16 and between the hub 76 and the spindle sleeve 68 in the radial direction 66. The inboard seal 82 prevents lubricant 42 from escaping past the interfaces between the hub 76 and inboard seal 82 and between the spindle sleeve 68 and the inboard seal 82. The inboard seal 82 may be provided in a variety of manners.

Figure 7:
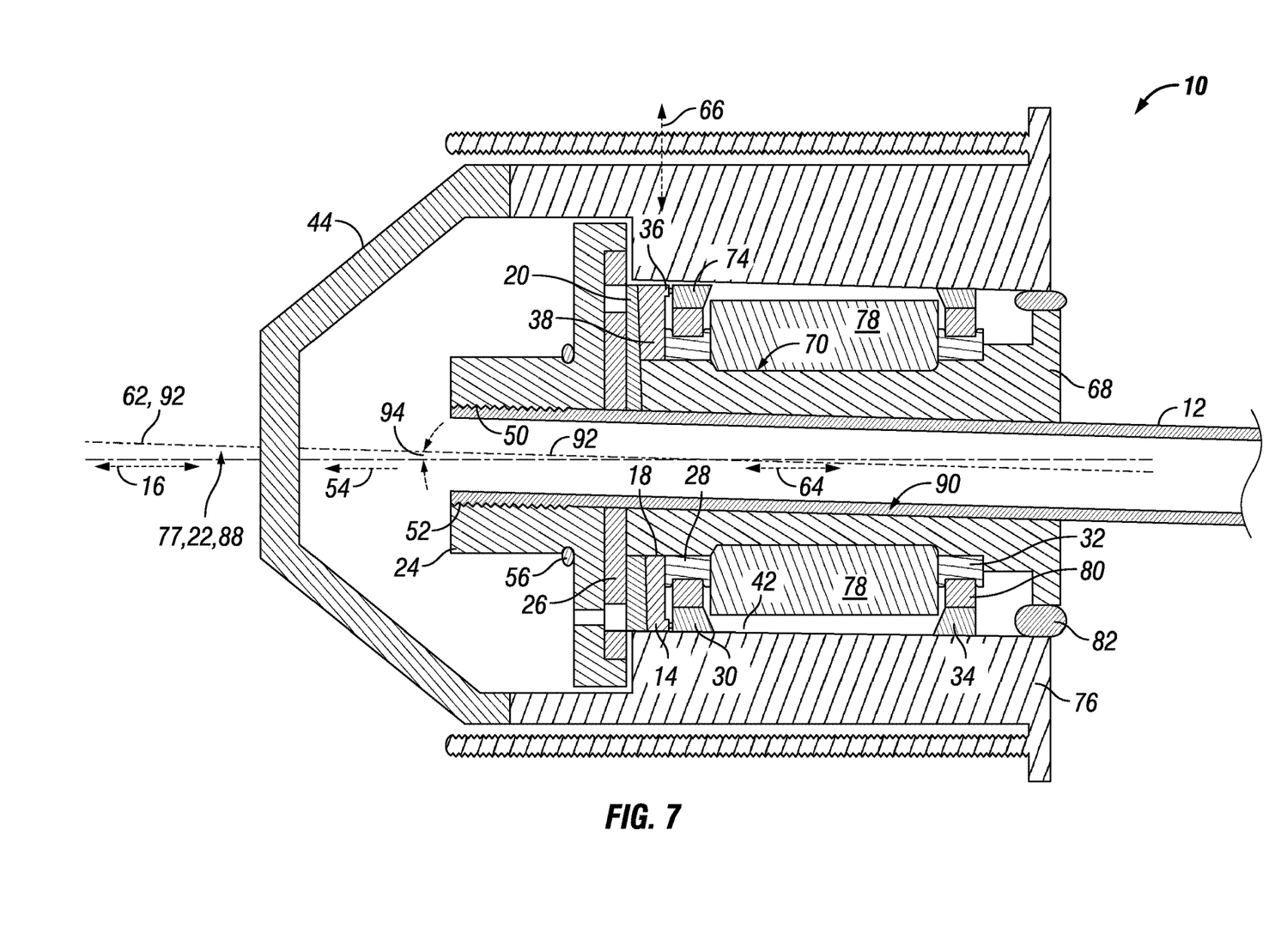
FIG. 7 is a cross-sectional view of the apparatus with a hubcap and an axle attached.

FIG. 7 shows the apparatus of FIG. 6 mounted onto an axle 12 of a vehicle that has an axis 62 that extends therethrough. The axis 62 is coaxial with the spindle sleeve inner surface axis 92, and the axis 62 is oriented at an angle 94 to the spindle sleeve outer surface axis 88, the hub axis 77, and the containment seal axis 22. The axle 12 has external threading 52 that engages complimentary internal threading 50 of the retaining nut 24 to function to hold the apparatus 10 onto the axle 12. A hubcap 44 may be located onto the hub 76 and secured thereon through the use of bolts or other fasteners. A gasket may be present at the interface between the hubcap 44 and the hub 76 to help seal this connection, and the hubcap 44 may function to keep debris out of portions of the apparatus 10 such as the axle 12, the lock nut 24, and the space sealed by the containment seal 14. The hubcap 44 is not an air tight or gas tight seal but instead functions to keep dirt, dust and debris from interior portions of the apparatus 10.

Assembly of the apparatus 10 onto axle 12 will now be described. The apparatus 10 may be provided as a prepackaged unit so that the assembler will first place the apparatus 10 onto the outboard end of the axle 12 and push it along the axle 12 in the inboard direction of the axle 12. The fit between the inner portions of the apparatus 10 and the exterior surface of the axle 12 is a precision fit and some force may be necessary to push the apparatus 10 along the axle 12. Once located onto the axle 12, the hubcap 44 is not located the apparatus 10 and the nut of the retaining nut 24 is visible and accessible. The user may rotate the retaining nut 24 with a large wrench or possible by hand in order to cause a key of the sleeve washer 20 to align with and then be disposed within a keyway of the axle 12 that is located as the end of the axle 12 in the outboard direction 54. This alignment then causes the correct camber and/or toe to be realized. As previously discussed, the rotation of the retaining nut 24 is translated to the sleeve washer 20 through a snap ring 56 attached to the retaining nut 24 that extends through an aperture of the retaining nut 24 that is aligned with an aperture of the lock plate 26 thus causing the lock plate 26 rotate. Pins extending into the lock plate 26 from the sleeve washer 20 cause these two components to be in rotational communication with one another so that rotation of the lock plate 26 causes the sleeve washer 20 to likewise rotate. The sleeve washer 20 is interlocked through the tabs and slots as discussed to the spindle sleeve 68 so that the spindle sleeve 68 will rotate with sleeve washer 20 is rotated. The spindle sleeve 68 may then be aligned into a desired orientation to that the right amount of camber and toe is realized.

Once the spindle sleeve is rotationally oriented onto the axle 12 in the desired orientation, the snap ring 56 can be disengaged to cause the rotation of the retaining nut 24 not to be communicated to the lock plate 26. Since this rotation is not communicated to the lock plate 26, rotation of the retaining nut 24 will not be transmitted to the spindle sleeve 68 as none of the intervening components themselves will rotate. The spindle sleeve 68 will not rotate upon rotation of the retaining nut 24, and rotation of the retaining nut 24 will cause it to be threaded along the axle 12 at the external threading 52 and the retaining nut 24 will move inboard in the axial direction 64. This movement will cause the locking plate 26, sleeve washer 20, containment seal 14, bearings 74 and 80, bearing spacer 78, spindle sleeve 68, and inboard seal 82 to move inboard in the axial direction 64 until these components are appropriately tightened onto the axle 12. Once properly tightened, the snap ring 56 can be placed back onto the lock nut 24 to again place the aforementioned components into rotational communication. This snap ring 56 placement is done in order to help keep the lock nut 24 from backing off of the axle 12 in the outboard direction 54 through normal forces and movement of the vehicle so that the apparatus 10 is more likely to stay in the desired location on the axle 12.

Figure 8:
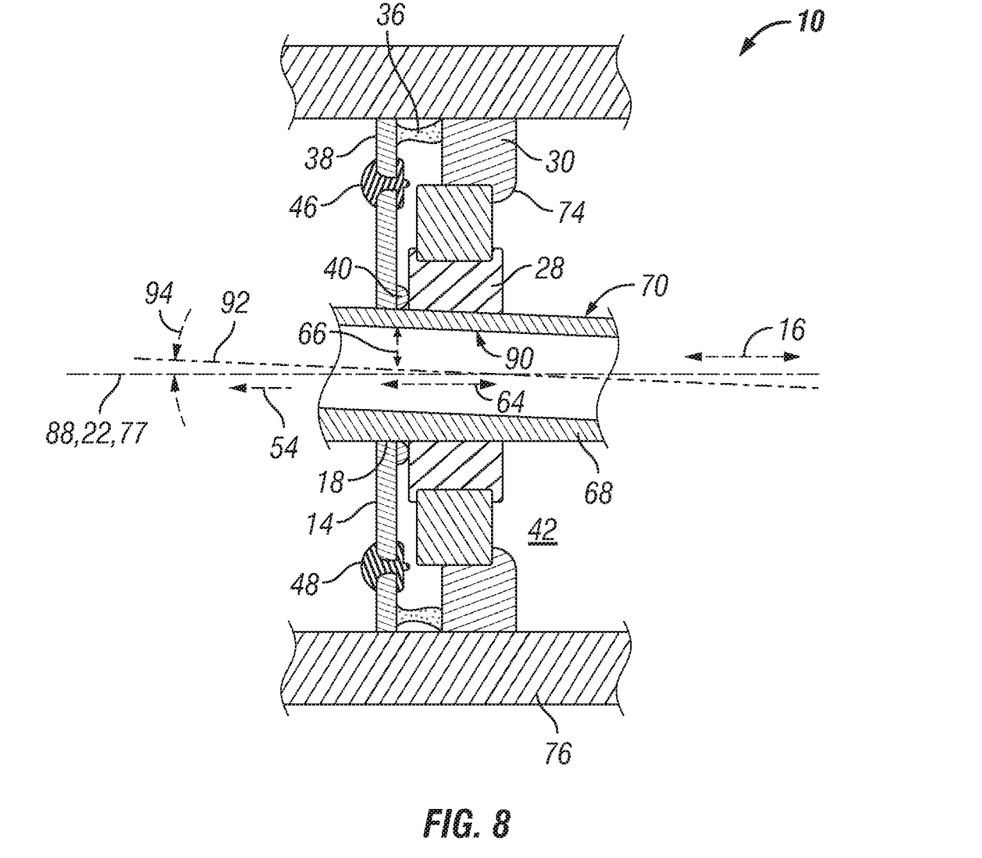
FIG. 8 is a cross-sectional view of the apparatus with a different exemplary embodiment of the containment seal.

An alternative exemplary embodiment of the apparatus 10 is shown in FIG. 8 in which the containment seal 14 is configured in a different manner than that previously disclosed. The containment seal 14 lacks a containment seal lip 60 and instead has a body 38 that is disc shaped with the same thickness in the axial direction 16 along its entire length in the radial direction 66. A felt ring 36 extends from the inner face of the body 38 and engages the outer race 30. The felt ring 36 has a concave surface that extends about the radial end of the felt ring 36. The felt ring 36 may engage the hub 76 and may function to seal the interface between the hub 76 and the body 38. The radial end of the body 38 may be straight or may be curved in cross-sectional shape and the body 38 may function to seal the interface between the body 38 and the hub 76. The interface at this location may be gas and liquid tight so that no lubricant 42 or gas in the sealed space can escape through this interface between the hub 76 and the body 38.

The containment seal 14 in the FIG. 8 embodiment also has a polymer ring 40 located on the inner face of the body 38 located at the inner radial end of the body 38 at the containment seal aperture 18. The polymer ring 40 engages the inner race 28 and prevents lubricant 42 and associated gases from escaping out of the sealed space past the inner race 28. The polymer ring 40 is made of a material more flexible than the body 38. The interface between the containment seal 14 and the axle 12 may be sealed via a tight, precision fit at this location to prevent lubricant 42 and gas from escaping the sealed space at this point. The polymer ring 40 may also engage the spindle sleeve outer surface 70 and function to create a seal to prevent gas and lubricant 42 from passing between the interface of the body 38 and the spindle sleeve 68. The polymer ring 40 may be a polymer wiper seal in some embodiments.

The containment seal 14 may include valves 46 and 48 that are attached to the body 38. The valves 46 and 48 may be any type of valve and in the embodiment shown are poppet valves 46 and 48. The poppet valves 46 and 48 may be identical to one another and function to relive pressure within the sealed space. As the lubricant 42 heats up, gas within the sealed space may become hot and cause a pressure increase in the sealed space. The poppet valves 46 and 48 will open once the pressure within the sealed space reaches a particular point, and this gas will be vented through the poppet valves 46 and 48 and out of the apparatus 10. The poppet valves 46 and 48 can be located 180 degrees from one another about the containment seal axis 22. In other embodiments, only a single poppet valve is present, and in yet other embodiments from 3-5, from 6-9, or up to 12 poppet valves may be present on the containment seal 14 at the body 38 to relive pressure within the apparatus 10. The provided valves 46 and 48 function to allow pressure buildup to escape the chamber having the lubricant 42.

The lubricant 42 may be of any type. If the lubricant 42 is a semi-fluid grease it is inherently less leak prone than other types of lubricant 42 such as liquid lubricants. If the lubricant 42 is semi-fluid grease, then the valves 46 and 48 need not be present, and any desired pressure venting of the lubricant 42 chamber may be achieved by the felt ring 36 alone as the felt will allow gas to be transferred therethrough but will not allow the passage of liquid or solid portions of the lubricant 42.

The containment seal 14 allows for a sealed space of the apparatus 10 to be realized so that the apparatus 10 can be prefilled with lubricant 42 before assembly onto the axle 12. This prefill increases the odds that the correct amount and type of lubricant 42 is placed into the apparatus 10 and also reduces contamination of the interior portions of the apparatus 10. This arrangement adds quality control and quality assurance to the apparatus 10, and adds convenience and reduced environmental risk to the installer of the wheel onto the axle 12.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for a vehicle, comprising:
a spindle sleeve with a spindle sleeve inner surface axis, wherein the spindle sleeve has a spindle sleeve outer surface axis that is not coaxial with the spindle sleeve inner surface axis;
a hub with a hub axis coaxial with the spindle sleeve outer surface axis;
a first bearing located within the hub;
a second bearing located within the hub;
a containment seal that engages the hub and the spindle sleeve; and
a sleeve washer, wherein the containment seal is located between the first bearing and the sleeve washer in an axial direction of the hub.

2. The apparatus as set forth in claim 1, wherein the spindle sleeve, the hub, the first bearing, the second bearing, the containment seal, and the sleeve washer are prepackaged into a preassembled assembly before installation onto an axle of a vehicle.

3. The apparatus as set forth in claim 2, wherein the containment seal has a felt ring that engages an outer race of the first bearing.

4. The apparatus as set forth in claim 1, wherein the containment seal engages the first bearing and the sleeve washer.

5. The apparatus as set forth in claim 1, wherein the containment seal has a containment seal aperture and a containment seal axis that extends through the containment seal aperture, wherein the spindle sleeve extends through the containment seal aperture, wherein the containment seal axis is coaxial with the spindle sleeve outer surface axis.

6. The apparatus as set forth in claim 1, wherein the containment seal has a body that is made of hardened steel.

7. The apparatus as set forth in claim 1, wherein the containment seal has a polymer ring that engages the spindle sleeve and that engages an inner race of the first bearing.

8. The apparatus as set forth in claim 1, further comprising lubricant that is located within the hub and that engages the hub, the first bearing, the second bearing, the spindle sleeve, and the containment seal.

9. The apparatus as set forth in claim 1, further comprising a hubcap that is attached to the hub, wherein the first bearing, the containment seal, and the sleeve washer are located between the hubcap and the second bearing in an axial direction of the hub.

10. The apparatus as set forth in claim 1, further comprising:
   an inboard seal that engages the spindle sleeve and the second bearing;
   a bearing spacer that engages both the first bearing and the second bearing, wherein the bearing spacer is located between the first bearing and the second bearing in an axial direction of the hub, and wherein the second bearing is located between the bearing spacer and the inboard seal in the axial direction of the hub.

11. The apparatus as set forth in claim 1, wherein the containment seal has a poppet valve that releases air from a space located within the hub that includes the first bearing and the second bearing.

12. The apparatus as set forth in claim 1, further comprising:
   an axle that has an axle axis, wherein the axle axis is coaxial with the spindle sleeve inner surface axis, wherein the axle engages the spindle sleeve.

13. The apparatus as set forth in claim 1, wherein the containment seal has a polymer ring that engages an outer race of the first bearing.

14. The apparatus as set forth in claim 1, further comprising:
   a lock plate that engages the sleeve washer and that is in rotational communication with the sleeve washer such that rotation of the lock plate causes rotation of the sleeve washer;
   a retaining nut that engages the lock plate; and
   a snap ring that engages the retaining nut and that engages the lock plate.

15. The apparatus as set forth in claim 1, wherein the containment seal has a containment seal body that is disc shaped and a containment seal lip that is ring shaped, wherein the containment seal lip extends away from the containment seal body in an axial direction of the containment seal, wherein the containment seal lip is located at a radial end of the containment seal, and wherein the containment seal has a containment seal aperture that is circular in shape and extends through the containment seal body, wherein the containment seal has a containment seal axis that extends through the containment seal aperture, wherein the containment seal body and the containment seal lip are made of metal.

* * * * *